United States Patent
Brown et al.

(10) Patent No.: US 10,656,908 B2
(45) Date of Patent: May 19, 2020

(54) METHOD AND APPARATUS FOR FACILITATING VOICE USER INTERFACE DESIGN

(71) Applicant: [24]7.ai, Inc., San Jose, CA (US)

(72) Inventors: Kathy L. Brown, San Ramon, CA (US); Vaibhav Srivastava, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 403 days.

(21) Appl. No.: 15/636,064

(22) Filed: Jun. 28, 2017

(65) Prior Publication Data

US 2017/0300296 A1 Oct. 19, 2017

Related U.S. Application Data

(63) Continuation of application No. 14/320,516, filed on Jun. 30, 2014, now Pat. No. 9,733,894.

(60) Provisional application No. 61/842,285, filed on Jul. 2, 2013.

(51) Int. Cl.
| | |
|---|---|
| *G06F 3/14* | (2006.01) |
| *G06F 3/16* | (2006.01) |
| *G06F 8/38* | (2018.01) |
| *G06F 40/20* | (2020.01) |
| *G10L 15/18* | (2013.01) |

(52) U.S. Cl.
CPC ............... *G06F 3/167* (2013.01); *G06F 8/38* (2013.01); *G06F 40/20* (2020.01); *G10L 15/1815* (2013.01)

(58) Field of Classification Search
CPC ........................................................ G06F 3/14
USPC .................... 715/728; 706/12; 717/102; 1/1
See application file for complete search history.

(56) References Cited

U.S. PATENT DOCUMENTS

| | | |
|---|---|---|
| 6,526,382 B1 | 2/2003 | Yuschik |
| 7,831,426 B2 | 11/2010 | Bennett |
| 7,920,682 B2 | 4/2011 | Byrne et al. |
| 8,315,874 B2 | 11/2012 | Barton et al. |
| 8,380,511 B2 | 2/2013 | Cave et al. |

(Continued)

FOREIGN PATENT DOCUMENTS

| | | |
|---|---|---|
| EP | 1669980 A2 | 6/2006 |
| WO | 2012047214 A2 | 4/2012 |

*Primary Examiner* — Ruay Ho
(74) *Attorney, Agent, or Firm* — Perkins Coie LLP; Michael Glenn

(57) ABSTRACT

A computer implemented method and an apparatus for facilitating voice user interface (VUI) design are provided. The method comprises identifying a plurality of user intentions from user interaction data. The method further comprises associating each user intention with at least one feature from among a plurality of features. One or more features from among the plurality of features are extracted from natural language utterances associated with the user interaction data. Further, the method comprises computing a plurality of distance metrics corresponding to pairs of user intentions from among the plurality of user intentions. A distance metric is computed for each pair of user intentions from among the pairs of user intentions. Furthermore, the method comprises generating a plurality of clusters based on the plurality of distance metrics. Each cluster comprises a set of user intentions. The method further comprises provisioning a VUI design recommendation based on the plurality of clusters.

31 Claims, 5 Drawing Sheets

(56) References Cited

U.S. PATENT DOCUMENTS

| | | |
|---|---|---|
| 8,699,674 B2 | 4/2014 | Bouzid et al. |
| 9,313,332 B1* | 4/2016 | Kumar ................ H04M 3/5232 |
| 2002/0133394 A1 | 9/2002 | Bushey et al. |
| 2003/0061029 A1 | 3/2003 | Shaket |
| 2008/0071533 A1 | 3/2008 | Cave et al. |
| 2008/0091406 A1 | 4/2008 | Baldwin et al. |
| 2008/0133245 A1 | 6/2008 | Proulx et al. |
| 2009/0043583 A1 | 2/2009 | Agapi et al. |
| 2009/0299745 A1 | 12/2009 | Kennewick et al. |
| 2010/0098225 A1 | 4/2010 | Ashton et al. |
| 2011/0010685 A1* | 1/2011 | Sureka ................... G06N 5/003 717/102 |
| 2011/0238410 A1 | 9/2011 | Larcheveque et al. |
| 2013/0325759 A1* | 12/2013 | Rachevsky ........... G10L 15/063 706/12 |
| 2014/0288932 A1 | 9/2014 | Yeracaris et al. |

* cited by examiner

METHOD AND APPARATUS FOR FACILITATING VOICE USER INTERFACE DESIGN

CROSS-REFERENCE TO RELATED APPLICATIONS

This application is a continuation of U.S. patent application Ser. No. 14/320,516, filed Jun. 30, 2014, now U.S. Pat. No. 9,733,894, which claims the benefit of U.S. provisional patent application No. 61/842,285, filed Jul. 2, 2013, each of which are incorporated herein in their entirety by this reference thereto.

FIELD

The invention generally relates to voice user interfaces (VUIs) and more particularly to designing of VUIs.

BACKGROUND

Voice-based user interfaces or voice user interfaces (VUIs) are integral to systems, such as interactive voice response (IVR) systems, which are configured to enable speech-based interactions between machines and users. A VUI is designed by anticipating questions that users may ask during interactions and constructing a dialog with prompts to enable the users to receive assistance without the need to interact with a human agent. In conventional approaches, VUIs are designed based on business logic and designer intuition. However, designing VUIs in such a manner has several limitations. For example, designing VUIs in an unambiguous manner is often a cumbersome activity with limited rate of success when using conventional approaches. Further, designing VUIs capable of handling applications involving dialogs with a large number of prompts is often a challenge when using conventional approaches. Moreover, conventionally designed VUIs are rendered inflexible while handling natural language utterances (for example, normal speech conversations).

SUMMARY

Various methods and apparatuses for facilitating VUI design are disclosed. In an embodiment, computer-implemented method for facilitating VUI design is disclosed. The method includes identifying, by an apparatus, a plurality of user intentions from user interaction data. The method further includes associating, by the apparatus, each user intention from among the plurality of user intentions with at least one feature from among a plurality of features. Moreover, one or more features from among the plurality of features are extracted from natural language utterances associated with the user interaction data. Further, the method includes computing, by the apparatus, a plurality of distance metrics corresponding to pairs of user intentions from among the plurality of user intentions. A distance metric is computed for each pair of user intentions from among the pairs of user intentions, where the distance metric is indicative of a measure of similarity between user intentions in a corresponding pair of user intentions. Furthermore, the method includes generating, by the apparatus, a plurality of clusters based on the plurality of distance metrics. Each cluster from among the plurality of clusters includes a set of user intentions from among the plurality of user intentions. The method also includes generating, by the apparatus, a VUI design recommendation based on the plurality of clusters.

In another embodiment, the apparatus for facilitating VUI design is disclosed. The apparatus includes at least one processor and a memory. The memory is adapted to store machine executable instructions therein, that when executed by the at least one processor, cause the apparatus to identify a plurality of user intentions from user interaction data. The apparatus is further caused to associate each user intention from among the plurality of user intentions with at least one feature from among a plurality of features. Moreover, one or more features from among the plurality of features are extracted from natural language utterances associated with the user interaction data. Further, the apparatus is caused to compute a plurality of distance metrics corresponding to pairs of user intentions from among the plurality of user intentions. A distance metric is computed for each pair of user intentions from among the pairs of user intentions, where the distance metric is indicative of a measure of similarity between user intentions in a corresponding pair of user intentions. The apparatus is further caused to generate a plurality of clusters based on the plurality of distance metrics. Each cluster from among the plurality of clusters includes a set of user intentions from among the plurality of user intentions. Furthermore, the apparatus is caused to generate a VUI design recommendation based on the plurality of clusters.

DESCRIPTION

The term "voice user interface" (VUI) as used herein refers to a user interface which utilizes voice/speech recognition to enable an apparatus to respond to voice commands and entries. The present technology provides methods and apparatuses for facilitating a designing of VUIs, which are described herein with reference to FIGS. 1 to 6.

Figure 1:
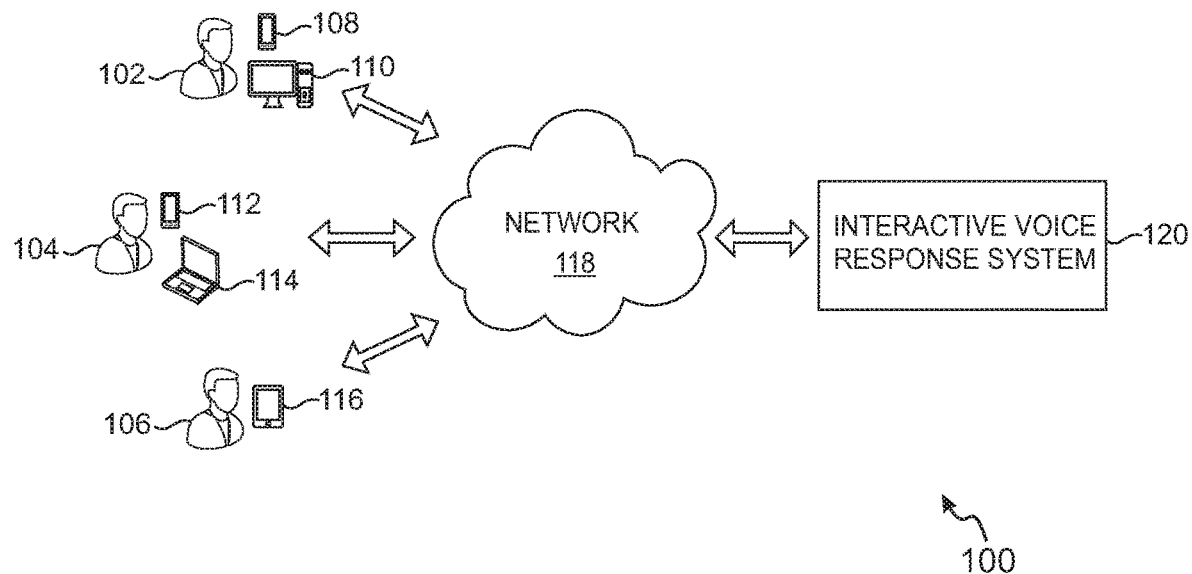
FIG. 1 is a schematic diagram showing an example environment in which various embodiments of the present technology may be practiced.

FIG. 1 is a schematic diagram showing an example environment 100 in which various embodiments of the present technology may be practiced. The environment 100 depicts a plurality of users, such as users 102, 104 and 106 (hereinafter collectively referred to as users 102-106). It is understood that the environment 100 is depicted to include three users for illustration purposes and that the environment 100 may include a plurality of users, such as the users 102-106. Each user from among the users 102-106 is depicted to be associated with one or more electronic devices for facilitating communication with remote entities.

For example, the customer 102 is depicted to be associated with electronic devices 108 and 110; the customer 104 is depicted to be associated with two electronic devices 112 and 114 and the customer 106 is depicted to be associated with an electronic device 116. Examples of the electronic devices 108, 110, 112, 114 and 116, may include laptop computers, mobile phones, Smartphones, tablet computers, desktop computers, personal digital assistants, Smart watches, web-enabled pair of glasses and the like. The electronic devices 108, 110, 112, 114 and 116 are hereinafter collectively referred to as user devices and singularly referred to as a user device.

The user devices are capable of connecting to a network 118 for communicating with a remote entity, such as an IVR system 120. Examples of the network 118 may include wired networks, wireless networks or a combination thereof. Examples of wired networks may include Ethernet, local area network (LAN), fiber-optic cable network and the like. Examples of wireless network may include cellular networks like GSM/3G/4G/CDMA networks, wireless LAN, blue-tooth or Zigbee networks and the like. Examples of combination of wired and wireless networks may include the Internet. It is noted that the environment 100 shown in FIG. 1 is merely illustrative and different environments (such as those that include more or less components, those that include additional connections, and/or those that are arranged in a different configuration) may be utilized with the present technology.

In an example scenario, the IVR system 120 is deployed as a customer interface at customer care facility to automate the process of serving the customers. The users 102-106 may contact (or engage) with the customer support representatives, such as for example, an human agent or an IVR system (such as the IVR system 120) at the customer care facility for a variety of reasons, such as for example, receiving information on services or products, receiving purchase assistance, posing queries concerning user accounts, resolving disputes/complaints and the like. The IVR system 120 includes a VUI configured to offer customers a dialog with prompts corresponding to possible intentions for engaging with the IVR system 120 so as to enable the user to receive assistance without the need to interact with a human agent. In conventional approaches, VUIs are designed based on business logic and designer intuition. However, designing VUIs in such a manner has several limitations. For example, designing VUIs in an unambiguous manner is often a cumbersome activity with limited rate of success when using conventional approaches. For example, the VUIs designed using conventional approaches are capable of handling applications involving only a small number of dialog prompts. For applications involving a large number of dialog prompts, taking into consideration a whole range of interaction possibilities for designing VUIs is often a challenge when using conventional approaches. Moreover, VUIs designed using conventional approaches are rendered inflexible while handling natural language utterances (for example, normal speech conversations). More specifically, VUIs designed using conventional approaches are more suitable for directed speech dialogs (for example, dialogs including a limited range of responses, such as "Yes" or "No" type of responses). However, such design approaches are incapable of handling natural language utterances, such as for example responses like "I am trying to use my credit card ending with digits 5111 for making a purchase at shopping-enterprise.com, however even after five attempts, I am not able to make the payment. Please help me out." Various embodiments of the present technology provide methods and apparatuses for facilitating VUI designs that are capable of overcoming these and other obstacles and providing additional benefits. More specifically, methods and apparatuses disclosed herein suggest provisioning of a VUI design recommendation based on data driven techniques in addition to business logic and designer intuition, which facilitates an unambiguous VUI design that is capable of handling natural language utterances as well as dialogs involving a large number of dialog prompts. An example apparatus configured to facilitate VUI design is explained with reference to FIG. 2.

Figure 2:
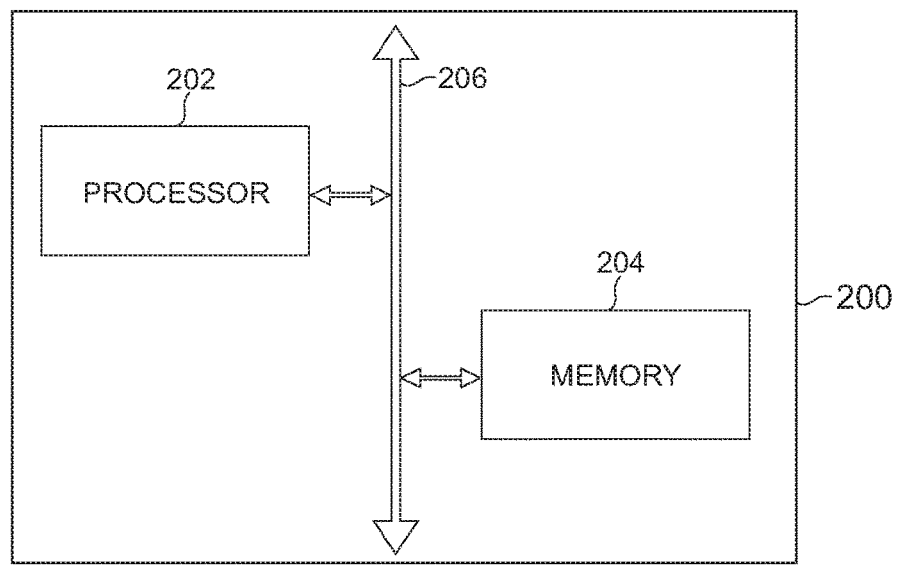
FIG. 2 is a block diagram of an example apparatus configured to facilitate VUI design in accordance with an embodiment.

FIG. 2 is a block diagram of an example apparatus 200 configured to facilitate VUI design in accordance with an embodiment. In an embodiment, the apparatus 200 is a part of a system configured to facilitate speech-based interaction between machines and humans, such as for example, the IVR system 120 of FIG. 1. Alternatively, the apparatus 200 may be a standalone component and communicatively associated with such a system. The apparatus 200 is configured to provide VUI design recommendations to VUI designers, so that unambiguous VUI may be designed and utilized in the systems such as the IVR system 120. In an example embodiment, the apparatus 200 may be any machine capable of executing a set of instructions (sequential and/or otherwise) so as to facilitate in designing of the VUI.

The apparatus 200 includes at least one processor, such as the processor 202 and a memory 204. It is noted that though the apparatus 200 is depicted to include only one processor, the apparatus 200 may include more number of processors therein. In an embodiment, the processor 202 and the memory 204 are configured to communicate with each other via or through a bus 206. Examples of the bus 206 may include, but are not limited to, a data bus, an address bus, a control bus, and the like. The bus 206 may be, for example, a serial bus, a bi-directional bus or a unidirectional bus.

In an embodiment, the memory 204 is capable of storing machine executable instructions. Further, the processor 202 is capable of executing the stored machine executable instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed. The processor 202 may include, among other things, a clock, an arithmetic logic unit (ALU) and logic gates configured to support an operation of the processor 202. The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

In an example embodiment, the processor 202 is configured to, with the content of the memory 204, cause the apparatus 200 to receive user interaction data. In an embodiment, the user interaction data includes interaction data generated during interactions between a plurality of users and customer support representatives. As explained with reference to FIG. 1, users may contact customer support representatives, such as for example, a human agent or an IVR system (such as the IVR system 120) at the customer care facility for a variety of reasons, such as for example, receiving information on services or products, receiving purchase assistance, posing queries concerning user accounts, resolving disputes/complaints and the like. The interaction data generated on account of the interactions may be stored in a database (for example, a web server). The apparatus 200 may be caused to receive the stored interaction data from the database and store the interaction data in the memory 204. The interaction data may include voice content (for example, on account of speech-based interaction between the users and the customer support representatives) and/or textual content (for example, on account of chat interaction between the users and the customer support representatives).

In an example embodiment, the processor 202 is configured to, with the content of the memory 204, cause the apparatus 200 to identify a plurality of user intentions from the user interaction data. The term 'user intention' is hereinafter referred to as 'intent' and implies a contextual reason for a user to contact a customer care facility. For example, if a user calls a customer care facility for paying a bill, then the intent may be identified as 'payments'. Similarly, if a user engages in an interaction with a customer support representative for disputing a charge on the bill, then the intent may be identified as 'disputes' (or 'complaints'). In an embodiment, the apparatus 200 may be configured to identify the plurality of intents by mining historical user interaction data. In an embodiment, the apparatus 200 is configured to use one or more text mining algorithms from among logistic regression, naïve Bayesian, rule engines, neural networks, decision trees, support vector machines, k-nearest neighbor, k-means and the like, to identify the plurality of intents from the user interaction data.

In an example embodiment, the processor 202 is configured to, with the content of the memory 204, cause the apparatus 200 to extract features from the user interaction data. As explained above, the interaction data may include voice content and textual content corresponding to the interactions. The voice content may include natural language utterances. In an embodiment, one or more features may be extracted from natural language utterances associated with user interaction data. The term 'natural language utterances' as used herein refers to normal speech conversations that users typically engage in, for example during interactions with customer support representatives. In an embodiment, the one or more features extracted from the natural language utterances include words, bi-grams, tri-grams, n-grams and part of speech (POS) tags. In an embodiment, the processor 202 is configured to, with the content of the memory 204, cause the apparatus 200 to convert/transcribe the natural language utterances into textual content. In an embodiment, for performing the conversion, the apparatus 200 may be caused to pass the natural language utterances through a batch automatic speech recognition (ASR) system. The ASR system may provide an independent, computer-driven transcription of a spoken language/speech into reliable textual content in real-time. In an automatic transcription by an ASR system, standard language modeling techniques, such as statistical language modeling (SLM) toolkit may be utilized for transcribing data associated with the natural language utterances. In an example embodiment, the apparatus 200 may be caused to use a dictation and/or a large vocabulary grammar, among other resources, to transcribe the natural language utterance into textual content. Further, the apparatus 200 may include pre-processing modules, such as for example a tokenizer module and/or a n-gram generator module (for example, within the processor 202) for tokening textual content corresponding to chat conversations as well as transcribed textual content corresponding to voice conversations and generating n-grams therefrom. For example, a natural language utterance "I want to pay my bill" may be tokenized into words, such as 'I', 'want', 'to', 'pay', 'my' and, bigrams (such as for example, 'I want' or 'my bill'), trigrams (such as for example, 'pay my bill') and/or n-grams may be generated from the tokens. Additionally, the apparatus 200 may be caused to extract POS tags, such as for example tags related to verbs, nouns, adjectives and other such contextual relationships in the natural language utterances. The memory 204 of the apparatus 200 may be configured to store the extracted words, bigrams, trigrams, n-grams and POS tags as features.

In an embodiment, the processor 202 is configured to, with the content of the memory 204, cause the apparatus 200 to facilitate defining of feature-based rules, such as for example, 'distance between two words should not exceed 4 words within a scope of a single line'. In an embodiment, the feature-based rules may be defined either using manual intervention or automatically based on mined information. Each feature-based rule may also be stored in the memory 204 as a feature. Accordingly, the extracted words, bigrams, trigrams, n-grams, tags, POS tags and feature-based rules may together constitute a plurality of features.

In an example embodiment, the processor 202 is configured to, with the content of the memory 204, cause the apparatus 200 to associate each intent from among the plurality of intents with at least one feature from among a plurality of features. For example, if an intent is identified as 'payments', then words, such as payment, charge, bill, dispute and the like, that are generally used in payment related interactions may be associated as features with the intent 'payments'. Further, even rules such as 'WORD (payment) NEAR WORD (dispute) WITHIN_DISTANCE (4)' may be associated with the intent 'payments'.

In an example embodiment, the processor 202 is configured to, with the content of the memory 204, cause the apparatus 200 to construct a category-feature matrix comprising a plurality of categories and the plurality of features. Each category from among the plurality of categories corresponds to an intent from among the plurality of intents. The category-feature matrix is configured to facilitate a visualization of an association of the at least one feature with each category (i.e. each intent). In an illustrative example, identified intents, such as 'payments', 'complaints', 'user accounts' and the like may serve as categories. One or more features associated with each of the identified intents may be tabulated along-side respective intents to construct the category-feature matrix. For example, words, such as 'credit card', 'billing' and the like, which are stored as features may be associated with an intent 'payments'. The category-feature matrix may accordingly include, for example a category as 'payments' associated with features such as 'credit card' and 'billing'. It is understood that the category-feature matrix may include a plurality of such categories along with their corresponding features. In an embodiment, the processor 202 is further configured to, with the content of the memory 204, cause the apparatus 200 to store the category feature matrix. More specifically, the memory 204 may be configured to store the plurality of intents along with features associated with each of the intents.

In an example embodiment, the processor 202 is configured to, with the content of the memory 204, cause the apparatus 200 to compute a plurality of distance metrics corresponding to pairs of intents from among the plurality of intents. More specifically, a distance metric is computed for each pair of intents. It is noted that the term 'distance metric' as used herein is indicative of a measure of similarity between intents included in the pair of intents. For example, the apparatus 200 may be caused to generate intent pairs and compute a distance metric for each such pair. In an illustrative example, if two intents: intent 1 and intent 2 configure a pair of intents, then the distance metric corresponding to the pair corresponds to a measure of similarity (or dissimilarity) between intent 1 and intent 2. In an embodiment, the measure of similarity corresponds to a correlation measure between the one or more features associated with each intent in the pair of intents. For example, if intent 1 is associated with features 1 and 2, and, intent 2 is associated with features 3 and 4, then the distance metric corresponding to the pair may be a measure of correlation between features 1, 2, 3 and 4.

In an embodiment, a high valve of a distance metric implies that the intents in the pair of intents are fairly dissimilar (thereby aiding unambiguous VUI design). Similarly, a low value of the distance metric implies that the intents in the pair of intents are fairly similar (thereby eliciting the need to define intents with greater distinction). For example, in the case of the following three intents: (1) Checking last bill payment amount (2) Making a bill payment (3) Changing a personal identification number (PIN) for a credit card; it is observed that the intents (1) and (2) are related to payments and hence fairly similar (i.e. associated with lower value of the distance metric), whereas the intent (3) is dissimilar to intents (1) and (2) and hence associated with higher value of the distance metric.

Various known and/or custom algorithms may be utilized for computing the distance metric. For example, at least one algorithm from among a cosine similarity based algorithm, a Pearson correlation based algorithm, a Spearman rank correlation based algorithm, a Kendall's tau based algorithm, a city block distance based algorithm, a Euclidian distance based algorithm and a custom algorithm derived from business logic and designer intuition may be utilized for computing distance metrics. In an embodiment, if two or more distance metrics are computed for each pair of intents using two or more algorithms, then a weighted average of the two or more distance metrics is performed to compute the distance metric for the each pair of intents.

In an example embodiment, the processor 202 is configured to, with the content of the memory 204, cause the apparatus 200 to generate a plurality of clusters based on the plurality of distance metrics such that each cluster includes a set of intents. More specifically, the apparatus 200 is caused to generate the plurality of clusters by generating a plurality of sets of intents. For example, the intents, which are substantially dissimilar from each other (for example, intents in intent pairs being associated with high values of distance metrics), may serve as top-level intents. Further, one or more intents may be linked to each of the top-level intents, for example based on the corresponding distance metrics between the respective intents and the top-level intents to configure sets of intents. Each such set of intents may represent a cluster. In an illustrative example, clusters generated by the apparatus 200 for designing of VUI for a banking-based IVR application as exemplarily depicted in Table 1 below

TABLE 1

Cluster Generation

| Cluster Reference | Intents |
|---|---|
| Cluster 1 | Rewards |
| Cluster 2 | Online account |
| Cluster 3 | Missing card; Card not working; New card application; New card activation; Dispute charge; Payment arrangements; Need replacement card |
| Cluster 4 | Recent transactions; Balance details |

Each cluster, such as Cluster 1, Cluster 2, Cluster 3, and Cluster 4 includes a set of intents. For example, the Cluster 1 includes one intent for rewards; Cluster 2 also includes one intent for online (user) account; Cluster 3 includes seven intents for missing card, card not working, new card application, new card activation, disputing a charge, payment arrangement and request for replacement card; and Cluster 4 includes two intents for recent transactions and balance details. In an example embodiment, at least one intent from among the set of intents in each cluster represents a top-level intent corresponding to the cluster.

In an embodiment, the clustering of intents is performed in a manner such that a value of distance metric corresponding to each pair of intents in a set of intents is less than a first pre-defined threshold value. In an illustrative example, an intent may be linked to a top-level intent if a distance metric corresponding to a pair of intents configured by the top-level intent and the respective intent is associated with a value, which is less than a first pre-defined threshold value. In other illustrative example, a new intent may be added to an existing set of two intents in a cluster if distance metric between the new intent and each of the two existing intents has a value less than the first pre-defined threshold value. In an embodiment, the apparatus 200 may be caused to dynamically select the first pre-defined threshold value. In an embodiment, the apparatus 200 may be configured to receive the first pre-defined threshold value based on a manual entry from a VUI designer. In an embodiment, the plurality of clusters is generated using at least one clustering algorithm from among K-means algorithm, a self-organizing map (SOM) based algorithm, a self-organizing feature map (SOFM) based algorithm, a density-based spatial clustering algorithm and an optics clustering based algorithm.

In an example embodiment, the processor 202 is configured to, with the content of the memory 204, cause the apparatus 200 to identify at least one intent in the set of intents with associated values of distance metrics between the at least one intent and remaining intents in the set of intents to be less than a second pre-defined threshold value. In an embodiment, the second pre-defined threshold value is less than the first pre-defined threshold value. As explained above, a value of distance metric corresponding to each pair of intents in each set of intents is less than a first pre-defined threshold value. Further, a check may be performed to identify at least one intent in each set of intents, which is associated with values of distance metrics between the at least one intent and remaining intents in the respective set of intents to be less than a second pre-defined threshold value. In an illustrative example, a value of a first pre-defined threshold value may be selected to be 0.5 so as to indicate that intents within each set of intents are fairly similar to each other. Further, a check may be performed to identify presence of an intent within each set of intents, which when paired with remaining intents in the set has corresponding distance metric values to be less than say 0.1 (for example, the second pre-defined threshold value may be selected to be 0.1). A distance metric value of 0.1 indicates that two intents in a pair are substantially similar and hence may lead to confusion when subsequently designing VUI dialog prompts. Accordingly, such intent may be split to generate two or more new intents. For example, an intent $I_1$ may be split up into, for example, two intents $I_{11}$ and $I_{12}$, such that the distance metrics of the intent $I_{11}$ and $I_{12}$ with remaining intents in the set of intents is greater than the second pre-defined threshold value (but less than the first pre-defined threshold value) and the new intents $I_{11}$ and $I_{12}$ are added to the set of intentions. A distance-metric based check, as explained above, may be repeated to identify a presence of an intent, which when paired with remaining intents in the set of intents has associated values of distance metrics to be less than the second pre-defined threshold value. If a presence of such intent is determined, then the splitting operation is again performed.

In an embodiment, new intents may be added to the set of intents in one or more cluster (either based on business logic or designer intuition or by splitting of intents as explained above). In an embodiment, the addition of new intents to the set of intents may be facilitated till a pre-determined stopping condition is met. An example of a pre-defined stopping condition is a limit on a maximum number of intents in each set of intents. For example, a VUI designer may provision the limit to be five. Accordingly, the addition of new intents to a set of intents may be stopped once a number of intents in the corresponding set of intents reaches five intents.

In an example embodiment, the processor 202 is configured to, with the content of the memory 204, cause the apparatus 200 to arrange intents corresponding to one or more clusters from among the plurality of clusters in a hierarchical structure to configure a plurality of levels of intents for the one or more clusters. As explained above, each cluster includes a set of intents with a top-level intent followed by one or more linked intents. The apparatus 200 may be caused to arrange intents in each set in a hierarchical structure such that one or more clusters are associated with a plurality of levels of intents. In an embodiment, the arrangement of intents into a plurality of levels may be performed solely based distance metric values corresponding to pairs of intents within each set of intents. In an embodiment, the arrangement of intents into a plurality of levels may be performed based on a combination of business logic, designer intuition and distance metric values corresponding to pairs of intents within each set of intents.

In an example embodiment, the processor 202 is configured to, with the content of the memory 204, cause the apparatus 200 to provision a VUI design recommendation based on the plurality of clusters. In an embodiment, the VUI design recommendation is embodied as a visual representation of the plurality of clusters with one or more clusters associated with a plurality of levels of intents. It is understood that the hierarchical structure based display of the intents is mentioned herein for illustration purposes and various possible representations may be generated for facilitating visualizing possible structures of intents for aiding in VUI design. In an embodiment, the VUI design recommendation is configured to support refinement in structure arrangement based on at least one of business logic and designer intuition. For example, a VUI designer may propose modifications, such as for example addition of one or more intents to the plurality of level of intents based on business logic or intuition, such as having the application deployed for larger audience or where sub-categories of intents are also to be included. The apparatus 200 is configured to update the plurality of levels based on the proposed modifications. For example, if previously an intent $I_{C_1}$ is located at a level 1 of a cluster $C_1$ and an addition of a new intent $I_{11}$ to the cluster $C_1$ is proposed, then the intent $I_{C_1}$ may be shifted a level down to for example level 2 and the new intent $I_{11}$ may be added at to the cluster $C_1$ at level 1.

In an example embodiment, VUI design recommendation is configured to facilitate an unambiguous design of a VUI for an IVR system. In an embodiment, the VUI design recommendation may be provisioned to a VUI designer, who may utilize the VUI design recommendation to visualize a hierarchy of intent classes and accordingly design the VUI. In an embodiment, the VUI design recommendation may be provisioned to VUI configuring system (or directly to an IVR), which may incorporate the design, with or without modifications to configure the VUI. In an embodiment, the apparatus 200 is further caused to provision appropriate dialog with prompts corresponding to the VUI design recommendation for facilitating interaction with a plurality of users. Alternatively, the VUI designer (or VUI configuring mechanism) may configure the set of dialog prompts based on mined information from historical data and the VUI design recommendations.

In embodiments where the apparatus 200 is a part of a system, such as IVR system, the apparatus 200 may be caused to receive a request for interaction by a user from among the plurality of users over a communication network (for example, a communication network, such as the network 118 of FIG. 1). The apparatus 200 may cause the system to query the user for determining a corresponding intent. Furthermore, the apparatus 200 is caused to provide an optimized interaction journey experience based on the VUI design recommendation and the determined intent. More specifically, the IVR system may be configured to assist the user using a VUI including dialog prompts designed based on the VUI design recommendation. As explained above, the VUI designed based on the VUI design recommendation includes dialog with unambiguous prompts, which precludes confusion and assists the user in a timely and efficient manner, thereby providing an optimized interaction journey experience to the user.

Figure 3:
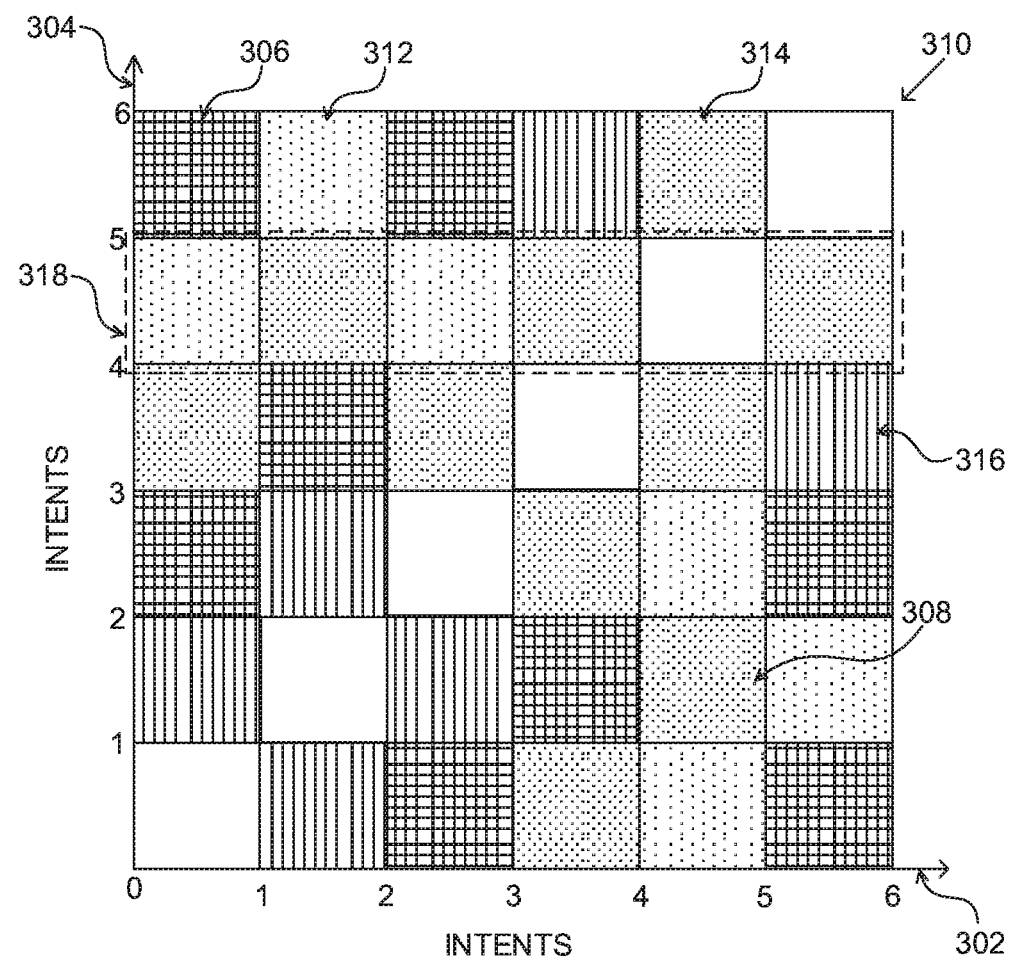
FIG. 3 is a schematic diagram showing a distance metric map in accordance with an example embodiment.

FIG. 3 is a schematic diagram showing a distance metric map 300 in accordance with an example embodiment. The distance metric map 300 visually depicts the measures of similarities between a plurality of intents. In an embodiment, an apparatus, such as the apparatus 200 of FIG. 2, is configured to generate the distance metric map 300. As explained with reference to FIG. 2, the apparatus 200 is caused to compute a plurality of distance metrics corresponding to pairs of intents (for example, one distance metric is computed for each pair of intents). As explained in FIG. 2, a distance metric is indicative of a measure of similarity between the intents in the pair of intents. In the distance metric map 300, six intents are plotted on each of X-axis 302 and Y-axis 304. The square plots (hereinafter referred to as plots) in quadrant bordered by the X-axis 302 and the Y-axis 304 correspond to the distance metrics computed between an intent on the X-axis 302 and a corresponding intent on the Y-axis 304 (the two intents together configuring a pair of intents). For example, plot 306 corresponds to a distance metric computed for a pair of intents configured by intent 1 and intent 6. Similarly plot 308 corresponds to a distance metric computed for pair of intents configured by intent 5 and intent 2.

Further, each plot is associated with a pattern from among five patterns (such as pattern 1, pattern 2, pattern 3, pattern 4 and pattern 5). Each pattern corresponds to a value of the distance metric (or more specifically, a density of the pattern is inversely proportional to a degree or measure of similarity between the intents). For example, pattern 1 represents the lowest value of distance metric (signifying an exact match between the intents). For example, the plots included in the diagonal 310 are associated with pattern 1 as they represent the lowest value of the distance metric (as the computation is performed between two identical intents, for example intent 1 and intent 1, or intent 2 and intent 2 and the like). Pattern 2 is configured to represent a small value of the distance metric (or more specifically, pattern 2 represents a substantial degree of similarity between the intents). For example, plot 312 associated with pattern 2 signifies a substantial degree of similarity between intents 2 and 6. Similarly, pattern 3 is configured to represent a slightly higher value of the distance metric as compared to the value of the distance metric associated with pattern 2 (or more specifically, pattern 3 represents a fair degree of similarity between the intents). For example, plot 314 associated with pattern 3 signifies a fair degree of similarity between intents 5 and 6. Pattern 4 is configured to represent a higher value of the distance metric as compared to the value of the distance metric associated with pattern 3 (or more specifically, pattern 4 represents a fair degree of distinction between the intents). For example, plot 316 associated with pattern 4 signifies a fair degree of distinction between intents 6 and 4. Similarly, pattern 5 is configured to represent a very high value of the distance metric (or more specifically, pattern 5 represents a substantial degree of distinction between the intents). For example, plot 306 associated with pattern 5 signifies a high degree of distinction of similarity between intents 1 and 6. It is understood that the distance metric map 300 is explained herein for illustration purposes and that many variations of visual representation of the computed distance metrics are possible. Further, the distance metric map 300 is configured to display six intents for example purposes. It is understood that the distance metric map 300 may be generated for fewer or more number of intents. Furthermore, many different patterns, such as the patterns 1 to 5, may be employed for visually depicting the measures of similarities between the intents as represented by the computed distance metrics.

In addition to providing simple means of visualizing the similarity/dissimilarity between the intents, the distance metric map 300 is capable of providing many insights. For example, row 318 includes plots, which are primarily associated with patterns 1, 2 and 3 signifying that intent 5 is mostly similar to other intents. In such cases, the intent may be split to generate two or more new intents as explained with reference to FIG. 2 so as to remove ambiguity in subsequent VUI design. In other illustrative example, the intents which are mostly distinct with other intents (for example, those associated with patterns 4 and 5, such as intent 6) may be chosen to be suitable candidates for top-level intents during generation of clusters as explained with reference to FIG. 2.

Figure 4:
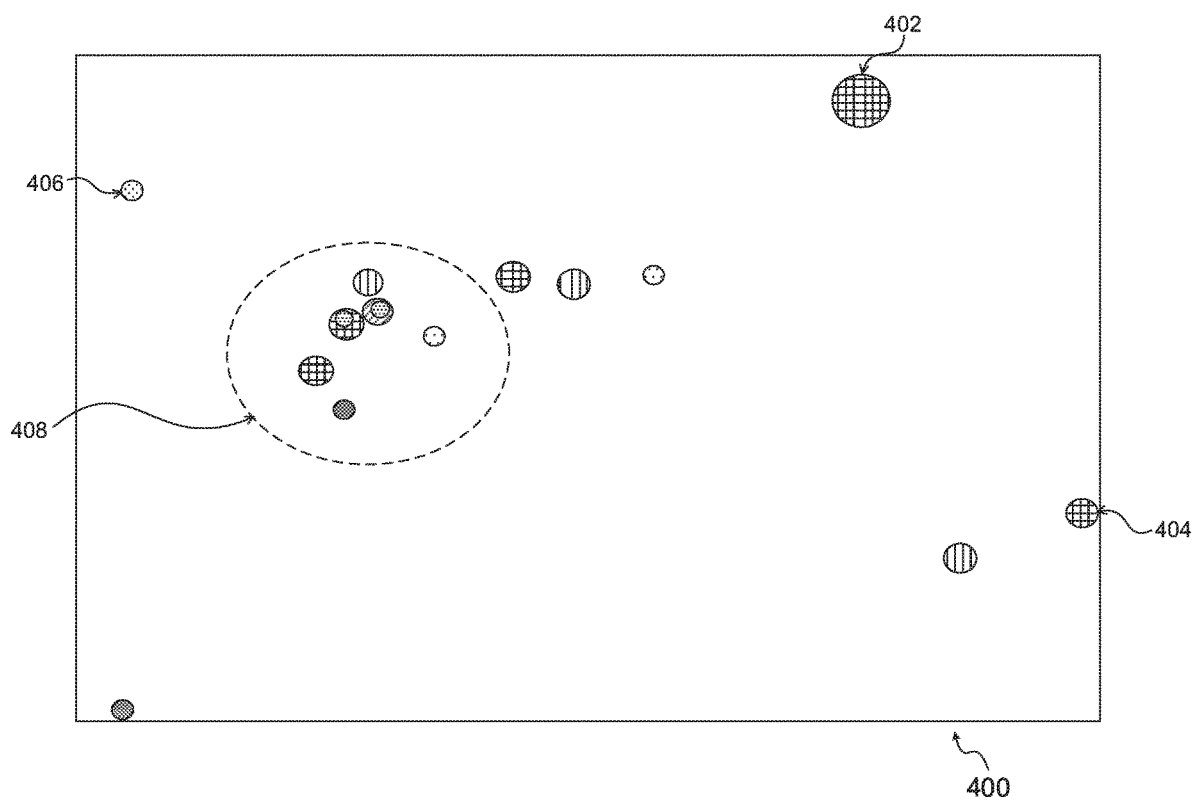
FIG. 4 is a schematic representation showing a plurality of clusters generated by the apparatus of FIG. 2 in accordance with an example embodiment.

Referring now to FIG. 4, a schematic representation 400 of a plurality of clusters generated by the apparatus 200 of FIG. 2 is shown in accordance with an example embodiment. The schematic representation 400 depicts a plurality of circular plots, such as circular plots 402, 404, 406 and the like, where each circular plot represents a cluster from among the plurality of clusters generated by the apparatus 200. The term 'circular plot' is hereinafter referred to as a 'circle' for purposes of the description.

As explained with reference to FIG. 2, each cluster includes a set of intents. In the schematic representation 400, a size of a circle represents a number of intents associated with the corresponding cluster. For example, a larger size of the circle (such as circle 402) implies that the corresponding cluster includes a large number of intents. Similarly, a smaller size of the circle (such as circle 406) implies that a corresponding cluster includes a relatively smaller number of intents. Further, a spatial separation between the circles (i.e. the clusters) indicates a degree of similarity between the intents in the corresponding clusters. For example, if the circles are closely bunched together within the schematic representation 400 (as depicted by region 408), then the top-level intents corresponding to the clusters are fairly similar to each other. As an illustrative example, in case of three top-level intents such as (1) Checking last bill payment amount (2) Making a bill payment and (3) Changing a personal identification number (PIN) for a credit card; it is observed that the intents (1) and (2) are fairly related to each other (for example, both intents relate to payments and hence their corresponding distance metric may be associated with relatively lower value) and hence their respective circles may be fairly close to each other, whereas the intent (3) is dissimilar to intents (1) and (2) and hence may be located far away from the circles corresponding to the top-level intents (1) and (2) in a schematic representation, such as the schematic representation 400. Further, each circle may be associated with a pattern (or in some example scenarios, with colors), where a density of the pattern may provide an indication of the degree of similarity between intents within each cluster. A visual depiction of measures of similarities between intents based on patterns is explained with FIG. 3 and is not explained herein. In an example embodiment, an average value of the distance metrics corresponding to pair of intents within each cluster may be computed to determine the pattern density for each circle to indicate a measure of similarity between intents in each cluster. Schematic representations, such as the schematic representation 400 may provide many insights, which may facilitate in refining the set of intents within each cluster and further assist in developing the hierarchical structure including a plurality of levels for one or more clusters. For example, the circle with the lightest density (implying that the set of intents within the corresponding cluster are fairly similar) may be subjected to analysis for re-defining intents therein. In an illustrative example, overlapping circles may indicate an overlap of large number of intents and accordingly the intents may be analyzed for assisting in improving distinction between their respective intents. In another illustrative example, large spatial separation between intents may provide suggestions for possible candidates for top-level intents to be included in the VUI design recommendation. An example VUI design recommendation provisioned by the apparatus 200 is depicted in FIG. 5.

Figure 5:
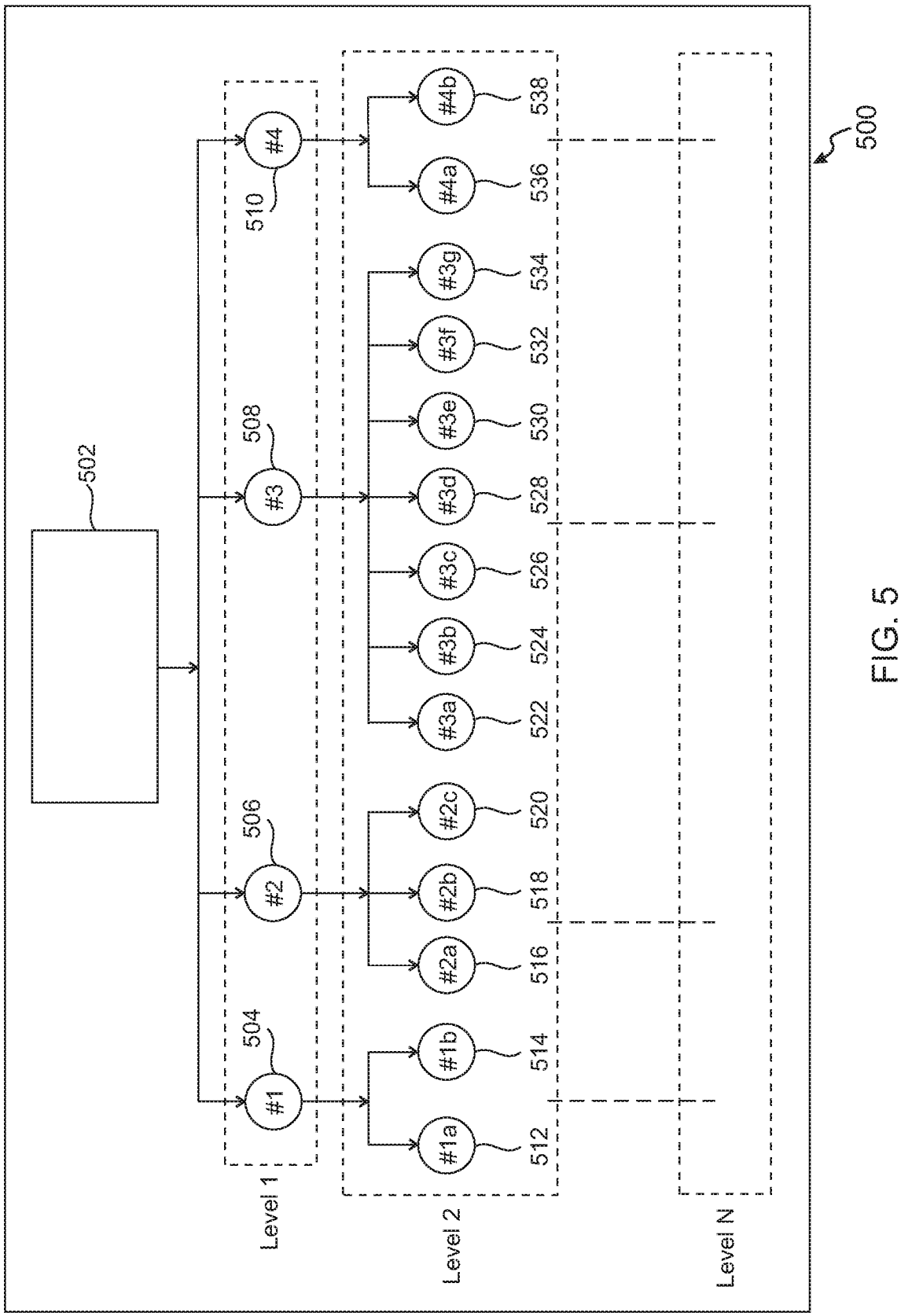
FIG. 5 is a schematic diagram showing a VUI design recommendation provisioned by the apparatus of FIG. 2 in accordance with an example embodiment.

Referring now to FIG. 5, a schematic diagram of a VUI design recommendation 500 provisioned by the apparatus 200 of FIG. 2 is shown in accordance with an example embodiment. The VUI design recommendation 500, as explained herein, is configured to facilitate VUI design for a banking-based IVR application in an IVR system. It is noted that such an implementation of a VUI design recommendation provisioned by the apparatus 200 is included herein for example purposes and that VUI design recommendations provisioned by the apparatus 200 may be implemented in a variety of VUI based applications.

The VUI design recommendation 500 includes a plurality of nodes, such as nodes 502, 504, 506, 508, 510, 512, 514, 516, 518, 520, 522, 524, 526, 528, 530, 532, 534, 536 and 538 (hereinafter collectively referred to as 'plurality of nodes'). The top node of the VUI design recommendation, for example node 502 may represent a 'Welcome message' being played to a customer attempting to communicate with the IVR system. For example, for a banking application, the welcome message may include, 'Welcome to XYZ bank. How can we assist you today?' Each of the remaining nodes from among the plurality of nodes may represent intent. As explained with reference to FIG. 2, a plurality of clusters may be generated based on plurality of distance metrics corresponding to pairs of intents, and, each cluster may include a set of intents. Further, the set of intents in the cluster may be arranged in a hierarchical structure to facilitate visualization of intents so as to enable an unambiguous VUI design. Accordingly, the VUI design recommendation 500 depicts four clusters represented by top-level intents '#1', '#2', '#3' and '#4' at nodes 504, 506, 508 and 510. The intents in each cluster are arranged in hierarchical structure to configure a plurality of levels. For example, in the cluster represented by top-level intent '#1', the intent at node 504 represents a level 1 intent and the intents at nodes 512 and 514 (exemplarily depicted as '#1a' and '#1b', respectively) represent level 2 intents and so on and so forth. For the cluster represented by top-level intent '#2', the intent at node 506 represents a level 1 intent and the intents at nodes 516, 518 and 520 (exemplarily depicted as '#2a', '#2b' and '#2c', respectively) represent level 2 intents and so on and so forth. For the cluster represented by top-level intent '#3', the intent at node 508 represents a level 1 intent and the intents at nodes 522, 524, 526, 528, 530, 532 and 534 (exemplarily depicted as '#3a', '#3b', '#3c', '#3d', '#3e', '#3f', and '#3g', respectively) represent level 2 intents and so on and so forth. For the cluster represented by top-level intent '#4', the intent at node 510 represents a level 1 intent and the intents at nodes 536 and 538 (exemplarily depicted as '#4a' and '#4b', respectively) represent level 2 intents and so on and so forth.

In an illustrative example, top-level intents '#1', '#2', '#3', and '#4' at nodes 504, 506, 508, 510, may correspond to categories such as for example 'rewards', 'online accounts', 'card related', and 'banking services', respectively for facilitating VUI design for a banking-based IVR application. The intents at subsequent levels in each cluster may be related to the respective categories. For example, the intents '#1a' and '#1b' associated with the rewards categories may correspond to 'credit card rewards' and 'loyalty rewards', intents respectively. The intents '#2a', '#2b' and '#2c' associated with online accounts category may correspond to 'credit card account', 'a debit card account' and a 'pension fund account', intents respectively. The intents '#3a', '#3b', '#3c', '#3d', '#3e', '#3f', and '#3g' associated with card related category may correspond to 'Missing card', 'Card not working', 'New card application', 'New card activation', 'Dispute charge', 'Payment arrangements' and 'Need replacement card', intents respectively. The intents '#4a' and '#4b' associated with banking services category may correspond to 'recent transaction details' and 'balance details', intents respectively.

As explained with reference to FIG. 2, the VUI design recommendation is configured to support refinement in structure arrangement based on at least one of business logic and designer intuition. For example, one or more intents may be added to one or more clusters. In an embodiment, the addition of an intent to a cluster may be facilitated upon determining that values of the distance metrics between the intent to be added and the set of existing intents in the cluster do not exceed the first pre-defined threshold value, as explained with reference to FIG. 2. In some scenarios, one or more intents may be split to generate one or more new intents as explained with reference to FIG. 2. When a new intent is created or added to a cluster, the previous intent may be pushed to a lower level and the new intent may be assigned to a higher level in the hierarchical structure. For example, if the previous intent is located at a higher level (for example, level 2), when a new intent is created, the previous intent is pushed to a lower level (for example, level 3) and the new intent is assigned to the higher level (for example, level 2. Further, as explained with reference to FIG. 2, the addition (through splitting of intents or new additions) may be performed till a pre-determined stopping condition is met.

In an embodiment, the VUI design recommendation 500 may be provided to a VUI designer or VUI configuring system to facilitate an unambiguous design of a VUI for an IVR system. In an embodiment, the apparatus 200 is further caused to provision appropriate dialog with prompts corresponding to the VUI design recommendation 500 for facilitating interaction with a plurality of users. In an embodiment, the VUI designer (or VUI configuring mechanism) may configure the set of prompts based on mined information from historical data and the VUI design recommendations. In an embodiment, the IVR system may be configured to assist the user using a VUI including dialog with prompts designed based on the VUI design recommendation. In an embodiment, the VUI designed based on the VUI design recommendation 500 includes unambiguous prompts, which precludes confusion and assists the user in a timely and efficient manner, thereby providing an optimized interaction journey experience to the user.

For example, an IVR system including a VUI designed based on the VUI design recommendation 500 may receive a customer query as follows: "I have lost my credit card, and I want to place a request for blocking my card." The IVR system may detect words/features such as 'lost', 'credit card', 'block' in the natural language utterance included in the customer query and identify the cluster '#3' with top-level intent corresponding to the category 'card related' based on match between the identified words and features associated with the cluster. The top-level intent '#3' in the VUI may be associated with a dialog prompt "Please confirm your credit card number", which may provisioned to the user. Upon receiving a user input for the card number, the IVR system may recognize the match with intent '#3a' at node 522 in the VUI (for example, associated with category related to 'Missing Card'). The intent '#3a' may be associated with a dialog prompt: "We are sorry for the loss of your credit card. We will block your card, and issue you a replacement card", which may then be provisioned to the customer. In an example scenario, the customer may respond to this prompt by saying: "Sure. Please block my credit card and issue me a replacement card". The IVR system may again detect features and words in the user query, for example, words like 'block', 'credit card', and 'replacement card' and identify the intent "#3g" at node 534 related to the category 'replacement card' and provide an appropriate dialog prompt such as "We have registered a request for a replacement card and you shall receive the same by 15$^{th}$ of this month". As explained herein with reference to the illustrative example, the VUI designed based on the VUI design recommendation 500 provides an optimized interaction journey experience to the customer. More specifically, as opposed to suggesting the customer to follow a number of levels before reaching a desired node as in conventional mechanisms, the VUI design allows the user to directly reach at the desired node. It will be noted herein that the response messages at each of the nodes of the hierarchical taxonomy may be customized based on historic user interaction data, and the examples provided herein are provided for description purposes and shall not be construed as limiting. It is understood that in various examples, the dialog prompts corresponding to the user query may be designed according to the application incorporating the VUI design. A method for facilitating VUI design is explained with reference to FIG. 6.

Figure 6:
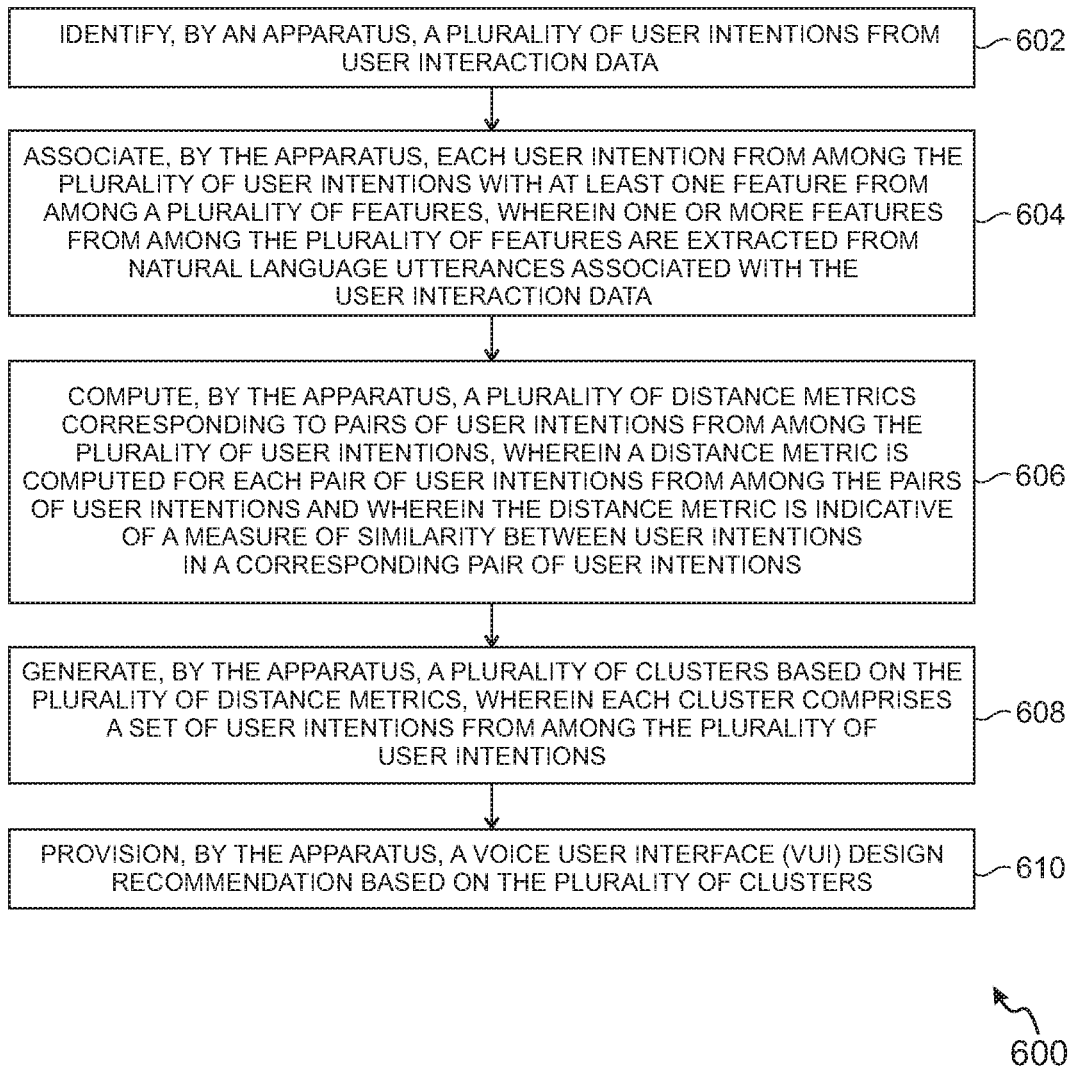
FIG. 6 is a flow diagram of a method for facilitating VUI design in accordance with an embodiment.

FIG. 6 is a flow diagram of a method 600 for facilitating VUI design in accordance with an example embodiment. The method 600 depicted in the flow diagram may be executed by, for example, the apparatus 200 explained with reference to FIGS. 2 to 5. Operations of the flowchart, and combinations of operation in the flowchart, may be implemented by, for example, hardware, firmware, a processor, circuitry and/or a different device associated with the execution of software that includes one or more computer program instructions. The operations of the method 600 are described herein with help of the apparatus 200. It is noted that, the operations of the method 600 can be described and/or practiced by using an apparatus other than the apparatus 200. The method 600 starts at operation 602.

At operation 602, a plurality of user intentions (referred to herein as intents) is identified from user interaction data by an apparatus (such as for example, the apparatus 200 of FIG. 2). In an embodiment, the user interaction data includes interaction data generated during interactions between a plurality of users and customer support representatives. In an embodiment, the interaction data may include voice content (for example, on account of speech-based interaction between the users and the customer support representatives) and/or textual content (for example, on account of chat interaction between the users and the customer support representatives). In an embodiment, the plurality of intents is identified by mining historical user interaction data using one or more text mining algorithms from among logistic regression, naïve Bayesian, rule engines, neural networks, decision trees, support vector machines, k-nearest neighbor, k-means and the like and the like, to identify the plurality of intents from the user interaction data. As explained with reference to FIG. 2, the term 'intent' implies a contextual reason for a user to contact a customer care facility. For example, if a user calls a customer care facility for paying a bill, then the intent may be identified as 'payments'. Similarly, if a user engages in an interaction with a customer support representative for disputing a charge on the bill, then the intent may be identified as 'disputes' (or 'complaints').

In an example embodiment, the method 600 further includes extracting features from the user interaction data. As explained above, the interaction data may include voice content and textual content corresponding to the interactions. The voice content may include natural language utterances. In an embodiment, the natural language utterances are converted/transcribed into textual content. In an embodiment, one or more features are extracted from natural language utterances associated with user interaction data. In an embodiment, the one or more features extracted from the natural language utterances include words, bi-grams, tri-grams, n-grams and POS tags. The conversion of natural language utterances into textual content and the extraction of features therefrom are performed as explained with reference to FIG. 2 and are not explained herein. In an embodiment, the method 600 further includes facilitating a defining of feature-based rules, such as for example, 'distance between two words should not exceed 4 words within a scope of a single line'. In an embodiment, the feature-based rules may be defined either using manual intervention or automatically based on mined information. The extracted words, bigrams, trigrams, n-grams, tags, POS tags and feature-based rules may together serve as a plurality of features.

At operation 604, each intent from among the plurality of intents is associated with at least one feature from among a plurality of features by the apparatus (such as for example, the apparatus 200 of FIG. 2). In an embodiment, one or more features from among the plurality of features are extracted from natural language utterances associated with the user interaction data. For example, if an intent is identified as 'payments', then words, such as payment, charge, bill, dispute and the like, that are generally used in payment related interactions may be associated as features with the intent 'payments'. Further, even rules such as 'WORD (payment) NEAR WORD (dispute) WITHIN_DISTANCE (4)' may be associated with the intent 'payments'.

In an example embodiment, a category-feature matrix including a plurality of categories and the plurality of features is constructed by the apparatus. Each category from among the plurality of categories corresponds to an intent from among the plurality of intents. The category-feature matrix is configured to facilitate a visualization of an association of the at least one feature with each category (i.e. each intent). In an illustrative example, identified intents, such as 'payments', 'complaints', 'user accounts' and the like may serve as categories. One or more features associated with each of the identified intents may be tabulated along-side respective intents to construct the category-feature matrix. For example, words, such as 'credit card', 'billing' and the like, which are stored as features may be associated with intent 'payments'. The category-feature matrix may accordingly include, for example a category as 'payments' associated with features such as 'credit card' and 'billing'. It is understood that the category-feature matrix may include a plurality of such categories along with their corresponding features.

At operation 606, a plurality of distance metrics corresponding to pairs of intents from among the plurality of intents is computed by the apparatus (such as for example, the apparatus 200 of FIG. 2). More specifically, a distance metric is computed for each pair of intents. As explained with reference to FIG. 2, the term 'distance metric' as used herein is indicative of a measure of similarity between intents included in the pair of intents. In an illustrative example, if two intents: intent 1 and intent 2 configure a pair of intents, then the distance metric corresponding to the pair corresponds to a measure of similarity (or dissimilarity) between intent 1 and intent 2. In an embodiment, the measure of similarity corresponds to a correlation measure between the one or more features associated with each intent in the pair of intents. For example, if intent 1 is associated with features 1 and 2, and, intent 2 is associated with features 3 and 4, then the distance metric corresponding to the pair may be a measure of correlation between features 1, 2, 3 and 4. In an embodiment, a high valve of a distance metric implies that the intents in the pair of intents are fairly dissimilar (thereby aiding unambiguous VUI design). Similarly, a low value of the distance metric implies that the intents in the pair of intents are fairly similar (thereby eliciting the need to define intents with greater distinction). Various known and/or custom algorithms may be utilized for computing the distance metric. For example, at least one algorithm from among a cosine similarity based algorithm, a Pearson correlation based algorithm, a Spearman rank correlation based algorithm, a Kendall's tau based algorithm, a city block distance based algorithm, a Euclidian distance based algorithm and a custom algorithm derived from business logic and designer intuition may be utilized for computing distance metrics. In an embodiment, if two or more distance metrics are computed for each pair of intents using two or more algorithms, then a weighted average of the two or more distance metrics is performed to compute the distance metric for the each pair of intents.

At operation 608, a plurality of clusters is generated based on the plurality of distance metrics by the apparatus (such as for example, the apparatus 200 of FIG. 2). In an embodiment, each cluster includes a set of intents from among the plurality of intents. For example, the intents, which are substantially dissimilar from each other (i.e. with corresponding intent pairs being associated with high values of distance metrics), may serve as top-level intents. Further, one or more intents may be linked to each of the top-level intents, for example based on the corresponding distance metrics between the respective intents and the top-level intents to configure sets of intents (for example, including the top-level intents). Each such set of intents may represent a cluster.

In an embodiment, the clustering of intents is performed in a manner such that a value of distance metric corresponding to each pair of intents in a set of intents is less than a first pre-defined threshold value. In an illustrative example, an intent may be linked to a top-level intent if a distance metric corresponding to a pair of intents configured by the top-level intent and the respective intent is associated with a value, which is less than a first pre-defined threshold value. In other illustrative example, a new intent may be added to an existing set of two intents in a cluster if distance metric between the new intent and each of the two existing intents has a value less than the first pre-defined threshold value. In an embodiment, the apparatus may be caused to dynamically select the first pre-defined threshold value. In an embodiment, the first pre-defined threshold value may be received based on a manual entry from a VUI designer. In an embodiment, the plurality of clusters is generated using at least one clustering algorithm from among K-means algorithm, a self-organizing map (SOM) based algorithm, a self-organizing feature map (SOFM) based algorithm, a density-based spatial clustering algorithm and an optics clustering based algorithm.

In an example embodiment, at least one intent in the set of intents with associated values of distance metrics between the at least one intent and remaining intents in the set of intents to be less than a second pre-defined threshold value is identified. In an embodiment, the second pre-defined threshold value is less than the first pre-defined threshold value. In an embodiment, the identified at least one intent is split to generate two or more new intents. In an embodiment, the method further includes facilitating adding of new intents to the set of intents till a pre-determined stopping condition is met. The splitting of intents into two or more new intents and addition of new intents to the set of intents may be performed as explained with reference to FIG. 2 and are not explained herein.

In an example embodiment, intents corresponding to one or more clusters from among the plurality of clusters are arranged in a hierarchical structure to configure a plurality of levels of intents for the one or more clusters by the apparatus. As explained above, each cluster includes a set of intents with a top-level intent followed by one or more linked intents. The intents in each set are arranged in a hierarchical structure such that one or more clusters are associated with a plurality of levels of intents. In an embodiment, the arrangement of intents into a plurality of levels may be performed solely based distance metric values corresponding to pairs of intents within each set of intents. In an embodiment, the arrangement of intents into a plurality of levels may be performed based on a combination of business logic, designer intuition and distance metric values corresponding to pairs of intents within each set of intents.

At operation 610, a VUI design recommendation is provisioned based on the plurality of clusters by the apparatus (such as for example, the apparatus 200 of FIG. 2). In an embodiment, the VUI design recommendation is configured to facilitate an unambiguous design of a VUI for an interactive voice response (IVR) system. In an embodiment, the VUI design recommendation is embodied as a visual depiction of the plurality of clusters with one or more clusters associated with a plurality of levels of intents as depicted in FIG. 5. In an embodiment, the VUI design recommendation is configured to support refinement in structure arrangement based on at least one of business logic and designer intuition. For example, a VUI designer may propose modifications, such as for example addition of one or more intents to the plurality of level of intents based on business logic or intuition.

In an example embodiment, an unambiguous design of a VUI for an IVR system is facilitated based on VUI design recommendation, for example as explained with reference to FIG. 5. In an embodiment, the VUI design recommendation may be provisioned to a VUI designer, who may utilize the VUI design recommendation to visualize a hierarchy of intent classes and accordingly configure the VUI. In an embodiment, the VUI design recommendation may be provisioned to VUI configuring system (or directly to an IVR), which may incorporate the design, with or without modifications to configure the VUI. In an embodiment, the appropriate dialog prompts corresponding to the VUI design recommendation are provided for facilitating interaction with a plurality of users. In an embodiment, the VUI designer (or VUI configuring mechanism) may configure the set of dialog prompts based on mined information from historical data and the VUI design recommendations.

In some embodiments, the method 600 further includes receiving a request for interaction by a user from among the plurality of users over a communication network (for example, a communication network, such as the network 118 of FIG. 1). The user may be queried for determining a corresponding intent. Furthermore, the method 600 includes providing an optimized interaction journey experience to the user based on the VUI design recommendation and the determined user intention. More specifically, the IVR system may be configured to assist the user using a VUI including dialog with prompts designed based on the VUI design recommendation. As explained above, the VUI designed based on the VUI design recommendation includes unambiguous dialog with prompts, which precludes confusion and assists the user in a timely and efficient manner, thereby providing an optimized interaction journey experience to the user as explained with reference to FIG. 5.

Without in any way limiting the scope, interpretation, or application of the claims appearing below, advantages of one or more of the exemplary embodiments disclosed herein include providing a VUI design recommendation for facilitating VUI design in systems, such as the IVR system. The VUI design recommendation provides clear visualization of the intent classes, which facilitates in finding out the intents, which are ambiguous by nature and help in classifying them suitably. Moreover, the VUI is designed in such a manner that various prompts associated with a user query may be clubbed together in layers/levels, thereby significantly reducing the time required to handle, analyze and respond to customer queries. Moreover, methods and apparatuses disclosed herein suggest provisioning of a VUI design recommendation based on data driven techniques in addition to business logic and designer intuition, which facilitates an unambiguous VUI design that is capable of handling natural language utterances as well as dialogs involving a large number of dialog prompts.

Various embodiments of the present technology, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology. Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
identifying, by a processor, a plurality of user intentions representing contextual reasons for seeking customer support from user interaction data;
associating, by the processor, each user intention from among the plurality of user intentions with at least one feature from among a plurality of features, the plurality of features representing words used when interacting with customer support;
computing, by the processor, a measure of similarity between user intentions in a corresponding pair of user intentions;
generating, by the processor, a plurality of clusters based on the measure of similarity between user intentions, wherein each cluster from among the plurality of clusters comprises a set of user intentions from among the plurality of user intentions;
wherein a value of the measure of similarity corresponding to each pair of user intentions in the set of user intentions is less than a first pre-defined threshold value;
identifying, by the processor, at least one user intention in the set of user intentions with associated values of measure of similarity between the at least one user intention and remaining user intentions in the set of user intentions to be less than a second pre-defined threshold value, the second pre-defined threshold value being less than the first pre-defined threshold value;
splitting the at least one user intention, by the apparatus, to generate two or more new user intentions; and
provisioning, by the processor, a voice user interface (VUI) design recommendation based on the plurality of clusters.

2. The method of claim 1, wherein the user interaction data comprises interaction data generated during interactions between a plurality of users and customer support representatives.

3. The method of claim 1, wherein a feature from among the one or more features is extracted from natural language utterances corresponding to one of a word, a bigram, a trigram, a n-gram, or a part of speech (POS) tag.

4. The method of claim 3, wherein a feature from among the plurality of features corresponds to a feature-based rule.

5. The method of claim 1, further comprising:
constructing, by the processor, a category-feature matrix comprising a plurality of categories and the plurality of features, wherein each category from among the plurality of categories corresponds to a user intention from among the plurality of user intentions, and wherein the category-feature matrix is configured to facilitate a visualization of an association of the at least one feature from among the plurality of features with each category.

6. The method of claim 1, wherein the measure of similarity corresponds to a correlation measure between the at least one feature associated with each user intention in the corresponding pair of user intentions.

7. The method of claim 1, wherein the measure of similarity is computed using at least one algorithm from among a cosine similarity based algorithm, a Pearson correlation based algorithm, a Spearman rank correlation based algorithm, a Kendall's tau based algorithm, a city block distance based algorithm, a Euclidian distance based algorithm, or a custom algorithm derived from business logic and designer intuition.

8. The method of claim 7, wherein the measure of similarity for each pair of user intentions is based on using two or more algorithms from among the at least one algorithm.

9. The method of claim 1, wherein the plurality of clusters is generated using at least one clustering algorithm from among a K-means algorithm, a self-organizing map based algorithm, a self-organizing feature map based algorithm, a density-based spatial clustering algorithm, or an optics clustering based algorithm.

10. The method of claim 1, further comprising:
facilitating addition of new user intentions to the set of user intentions until a pre-determined stopping condition is met.

11. The method of claim 1, further comprising:
arranging, by the processor, user intentions corresponding to one or more clusters from among the plurality of clusters in a hierarchical structure to configure a plurality of levels of user intentions for the one or more clusters.

12. The method of claim 11, wherein provisioning the VUI design recommendation comprises generating a visual representation of the plurality of clusters, wherein the one or more clusters from among the plurality of clusters are associated with a plurality of levels of user intentions.

13. The method of claim 12, wherein the VUI design recommendation is configured to support refinement in structure arrangement based on at least one of business logic and designer variables.

14. The method of claim 12, wherein the VUI design recommendation is configured to facilitate a design of a VUI for an interactive voice response (IVR) system.

15. The method of claim 14, further comprising:
provisioning, by the processor, appropriate dialog with prompts corresponding to the VUI design recommendation for facilitating interaction with a plurality of users.

16. The method of claim 15, further comprising:
receiving, by the processor, a request for interaction by a user from among the plurality of users over a communication network;
querying the user, by the apparatus, for determining a corresponding user intention; and
providing, by the processor, an optimized interaction journey experience based on the VUI design recommendation and the determined user intention.

17. An apparatus comprising:
at least one processor; and
a memory having stored therein machine executable instructions, that when executed by the at least one processor, cause the apparatus to:
identify a plurality of user intentions representing contextual reasons for seeking customer support from user interaction data;
associate each user intention from among the plurality of user intentions with at least one feature from among a plurality of features, the plurality of features representing words used when interacting with customer support;
compute a measure of similarity between user intentions in a corresponding pair of user intentions;
generate a plurality of clusters based on the measure of similarity between user intentions, wherein each cluster from among the plurality of clusters comprises a set of user intentions from among the plurality of user intentions;
wherein a value of the measure of similarity corresponding to each pair of user intentions in the set of user intentions is less than a first pre-defined threshold value; and wherein the apparatus is further caused to:
identify at least one user intention in the set of user intentions with associated values of the measure of similarity between the at least one user intention and remaining user intentions in the set of user intentions to be less than a second pre-defined threshold value, the second pre-defined threshold value being less than the first pre-defined threshold value;
split the at least one user intention to generate two or more new user intentions;
facilitate addition of new user intentions to the set of user intentions till a pre-determined stopping condition is met; and
provision a VUI design recommendation based on the plurality of clusters.

18. The apparatus of claim 17, wherein the user interaction data comprises interaction data generated during interaction between a plurality of users and customer support representatives.

19. The apparatus of claim 17, wherein a feature from among the one or more features is extracted from natural language utterances corresponding to one of a word, a bigram, a trigram, a n-gram, or a POS tag.

20. The apparatus of claim 19, wherein a feature from among the plurality of features corresponds to a feature-based rule.

21. The apparatus of claim 17, wherein the apparatus is further caused to:
construct a category-feature matrix comprising a plurality of categories and the plurality of features, wherein each category from among the plurality of categories corresponds to a user intention from among the plurality of user intentions, and wherein the category-feature matrix is configured to facilitate a visualization of an association of the at least one feature from among the plurality of features with each category.

22. The apparatus of claim 17, wherein the measure of similarity corresponds to a correlation measure between the at least one feature associated with each user intention in the corresponding pair of user intentions.

23. The apparatus of claim 17, wherein the measure of similarity is computed using at least one algorithm from among a cosine similarity based algorithm, a Pearson correlation based algorithm, a Spearman rank correlation based algorithm, a Kendall's tau based algorithm, a city block distance based algorithm, a Euclidian distance based algorithm, or a custom algorithm derived from business logic and designer intuition.

24. The apparatus of claim 23, wherein the measure of similarity is computed for each pair of user intentions using two or more algorithms from among the at least one algorithm.

25. The apparatus of claim 17, wherein the plurality of clusters is generated using at least one clustering algorithm from among K-means algorithm, a self-organizing map based algorithm, a self-organizing feature map based algorithm, a density-based spatial clustering algorithm, or an optics clustering based algorithm.

26. The apparatus of claim 17, wherein the apparatus is further caused to:
arrange user intentions corresponding to one or more clusters from among the plurality of clusters in a hierarchical structure to configure a plurality of levels of user intentions for the one or more clusters.

27. The apparatus of claim 26, wherein provisioning the VUI design recommendation comprises generating a visual representation of the plurality of clusters, wherein the one or more clusters from among the plurality of clusters are associated with a plurality of levels of user intentions.

28. The apparatus of claim 27, wherein the VUI design recommendation is configured to support refinement in structure arrangement based on at least one of business logic and designer intuition.

29. The apparatus of claim 27, wherein the VUI design recommendation is configured to facilitate an unambiguous design of a VUI for an IVR system.

30. The apparatus of claim 29, wherein the apparatus is further caused to:
provision appropriate dialog with prompts corresponding to the VUI design recommendation for facilitating interaction with a plurality of users.

31. The apparatus of claim 30, wherein the apparatus is further caused to:
receive a request for interaction by a user from among the plurality of users over a communication network;
query the user for determining a corresponding user intention; and
provide an optimized interaction journey experience based on the VUI design recommendation and the determined user intention.

* * * * *